US012415545B2

(12) United States Patent
Gupta et al.

(10) Patent No.: US 12,415,545 B2
(45) Date of Patent: Sep. 16, 2025

(54) METHODS AND SYSTEMS FOR COLLISION CONTROL OF MOVING VEHICLES SURROUNDED BY VEHICLES

(71) Applicant: Toyota Motor Engineering & Manufacturing North America, Inc., Plano, TX (US)

(72) Inventors: Rohit Gupta, Santa Clara, CA (US); Amr Abdelraouf, Redwood City, CA (US); Kyungtae Han, Palo Alto, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 239 days.

(21) Appl. No.: 18/455,020

(22) Filed: Aug. 24, 2023

(65) Prior Publication Data
US 2025/0065916 A1 Feb. 27, 2025

(51) Int. Cl.
*B60W 60/00* (2020.01)
*B60W 30/09* (2012.01)
(Continued)

(52) U.S. Cl.
CPC ........ *B60W 60/0015* (2020.02); *B60W 30/09* (2013.01); *B60W 30/0953* (2013.01);
(Continued)

(58) Field of Classification Search
CPC ............. B60W 30/09; B60W 30/0953; B60W 30/0956; B60W 50/0097; B60W 60/0015;
(Continued)

(56) References Cited

U.S. PATENT DOCUMENTS 10,147,324 B1 * 12/2018 Kuffner, Jr. .......... G08G 1/0962
11,124,204 B1 * 9/2021 Narang .................. G06N 3/045
(Continued)

FOREIGN PATENT DOCUMENTS

CN 112530202 A 3/2021
CN 114117259 A 1/2022
(Continued)

OTHER PUBLICATIONS

Interaction-aware trajectory prediction of connected vehicles using CNN-LSTM networks(https://www.researchgate.net/publication/341639358_Interaction-Aware_Trajectory_Prediction_of_Connected_Vehicles_using_CNN-LSTM_Networks); May 2020.
(Continued)

*Primary Examiner* — Anshul Sood
(74) *Attorney, Agent, or Firm* — Dinsmore & Shohl LLP (57) ABSTRACT

Embodiments of methods and systems include determining a driving maneuver to be performed by an ego vehicle based on a road geometry and a lane geometry, the ego vehicle surrounded by one or more surrounding vehicles, retrieving a trajectory model corresponding to the driving maneuver, encoding kinematic data of the surrounding vehicles relative to the ego vehicle to generate spatial relationships between the surrounding vehicles and the ego vehicle, predicting future trajectories of the surrounding vehicles based on the spatial relationships, the kinematic data, the road geometry, and the lane geometry, generating a collision coefficient based on the future trajectories and the driving maneuver, and when the collision coefficient is greater than a predetermined threshold value, determining an escape route for the ego vehicle, and causing the ego vehicle to autonomously operate based on the escape route.

20 Claims, 6 Drawing Sheets

(51) Int. Cl.
*B60W 30/095* (2012.01)
*G08G 1/16* (2006.01)

(52) U.S. Cl.
CPC .... *B60W 30/0956* (2013.01); *B60W 60/0027* (2020.02); *G08G 1/166* (2013.01); *B60W 2420/403* (2013.01); *B60W 2420/408* (2024.01); *B60W 2420/54* (2013.01); *B60W 2552/53* (2020.02); *B60W 2554/4045* (2020.02); *B60W 2554/80* (2020.02)

(58) Field of Classification Search
CPC . B60W 60/0027; G05B 13/027; G06N 3/044; G06N 3/045; G08G 1/166
See application file for complete search history.

(56) References Cited

U.S. PATENT DOCUMENTS

| | | | | |
|---|---|---|---|---|
| 11,126,185 | B2* | 9/2021 | McGill, Jr. | G05D 1/0257 |
| 11,126,186 | B2* | 9/2021 | McGill, Jr. | G05D 1/0255 |
| 11,126,187 | B2* | 9/2021 | McGill, Jr. | G05D 1/0088 |
| 11,443,184 | B2* | 9/2022 | McGill | G06N 3/08 |
| 2020/0064850 | A1* | 2/2020 | Hong | G05D 1/0088 |
| 2021/0009163 | A1 | 1/2021 | Urtasun et al. | |
| 2021/0082283 | A1 | 3/2021 | Malla et al. | |
| 2021/0295171 | A1 | 9/2021 | Kamenev et al. | |
| 2021/0300438 | A1 | 9/2021 | Granieri et al. | |
| 2021/0403008 | A1* | 12/2021 | Grossman | B60W 60/0027 |
| 2022/0289179 | A1 | 9/2022 | Thomas et al. | |
| 2023/0141801 | A1* | 5/2023 | Schweidel | B60W 50/087 701/23 |

FOREIGN PATENT DOCUMENTS

| | | |
|---|---|---|
| CN | 114802296 A | 7/2022 |
| CN | 114926823 A | 8/2022 |
| JP | 2003025868 A | 1/2003 |
| WO | 2022231519 A1 | 3/2022 |
| WO | 2022001773 A1 | 6/2022 |

OTHER PUBLICATIONS

Deep learning based trajectory prediction for autonomous vehicles (https://theses.hal.science/tel-03681696/document); May 30, 2022.

* cited by examiner

METHODS AND SYSTEMS FOR COLLISION CONTROL OF MOVING VEHICLES SURROUNDED BY VEHICLES

TECHNICAL FIELD

The present disclosure relates to collision control systems, and more particularly, to methods and systems for collision control of moving vehicles surrounded by vehicles.

BACKGROUND

When driving on a road with multiple lanes, it is common to encounter situations where an ego vehicle is surrounded by other vehicles. Interacting with these other drivers requires quick reactions to avoid collisions, as the other drivers may make errors, have limited visibility, make sudden maneuvers, vary their speeds, or experience emergencies. To navigate through such dynamic traffic scenarios, there is a need for a system that can quickly respond and provide assistance to improve the driving experience and reduce the chance of collision.

SUMMARY

In a first aspect, a method includes determining a driving maneuver to be performed by an ego vehicle based on a road geometry and a lane geometry, where the ego vehicle is surrounded by one or more surrounding vehicles, retrieving a trajectory model corresponding to the driving maneuver, encoding, using the trajectory model, kinematic data of the surrounding vehicles relative to the ego vehicle to generate spatial relationships between the surrounding vehicles and the ego vehicle, where the kinematic data are generated based on sensor data associated with the surrounding vehicles, predicting, using the trajectory model, future trajectories of the surrounding vehicles based on the spatial relationships, the kinematic data, the road geometry, and the lane geometry, generating a collision coefficient indicating a likelihood of collision between the ego vehicle and one or more of the surrounding vehicles based on the future trajectories and the driving maneuver, and when the collision coefficient is greater than a predetermined threshold value, determining an escape route for the ego vehicle, and causing the ego vehicle to autonomously operate based on the escape route.

In a second aspect, a system comprising an ego vehicle, sensors operable to collect sensor data associated with surrounding vehicles surrounding the ego vehicle, and a controller configured to determine a driving maneuver to be performed by the ego vehicle based on a road geometry and a lane geometry, where the ego vehicle is surrounded by one or more surrounding vehicles, retrieve a trajectory model corresponding to the driving maneuver, encode, using the trajectory model, kinematic data of the surrounding vehicles relative to the ego vehicle to generate spatial relationships between the ego vehicle and the surrounding vehicles, where the kinematic data are generated based on the sensor data, predict, using the trajectory model, future trajectories of the surrounding vehicles based on the spatial relationships, the kinematic data, the road geometry, and the lane geometry, generate a collision coefficient indicating a likelihood of collision between the ego vehicle and one or more of the surrounding vehicles based on the future trajectories and the driving maneuver, and when the collision coefficient is greater than a predetermined threshold value, determine an escape route for the ego vehicle, and cause the ego vehicle to autonomously operate based on the escape route.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein are directed to methods and systems of collision control for moving ego vehicles surrounded by multiple vehicles, typically on multi-lane roads. The ego vehicles may have one or more sensors onboard to collect sensor data associated with the surrounding vehicles as well as the road and lane geometries of the multi-lane road. The system may use a trajectory model corresponding to a driving maneuver the ego vehicle is about to perform according to the lane and road geometries. The trajectory model may use the sensor data to establish spatial relationships between the ego vehicle and the surrounding vehicles and predict whether a collision may happen and providing an alert or cause the ego vehicle to escape from the collision.

The disclosed systems and methods provide a real-time collision control solution for ego vehicles operating on multi-lane roads surrounded by multiple vehicles. By integrating one or more onboard sensors, the system collects sensor data concerning both the surrounding vehicles and the road and lane geometries. Leveraging this information, the system employs a trajectory model corresponding to the ego vehicle's intended driving maneuver based on the lane and road geometries. Through this model, the system establishes spatial relationships between the ego vehicle and surrounding vehicles, enabling it to predict potential collision scenarios with controlled trigger parameters. In undesired situations where a collision is imminent, the system may take decisive actions, providing real-time alerts to the driver or initiating automatic maneuvers to steer the ego vehicle away from the collision path. This proactive approach to avoid collision is desirable for users of the ego vehicles, other road users, and nearby vehicles. Moreover, the system's adaptability to different road conditions and multi-vehicle scenarios makes it suitable for busy intersections, highways, and/or complex driving environments. As autonomous driving technologies continue to develop, the present system helps self-driving cars avoid accidents.

Further, the systems are able to establish spatial relationships between the ego vehicle and surrounding vehicles and are valuable in scenarios where lane lines fade or are unclear, such as in intersections or areas under construction. In these situations, traditional lane-keeping systems may struggle due to the lack of clear lane markings, leading to potential risks of collisions or unpredictable behavior from other drivers. However, the trajectory model employed by the present collision control system can use the sensor data to interpret the intentions and movements of other vehicles, even in the absence of clear lane markings. By predicting potential collision risks and providing timely alerts or initiating avoidance maneuvers, the present system offers an added layer of collision control and stability in challenging driving conditions. This capability can be applied to autonomous vehicles and advanced driver-assistance systems (ADAS) to navigate through urban environments where road markings may be less visible or temporarily altered.

As disclosed herein, a road geometry refers to the overall design and layout of a road, encompassing various physical characteristics that influence its functionality and safety. The road geometry involves the three-dimensional alignment of the road, considering factors like horizontal curvature, vertical alignment, cross-sectional design, and superelevation. Horizontal curvature defines the road's bends and curves along its length, while vertical alignment accounts for changes in elevation, ensuring smooth transitions for vehicles. The cross-sectional design specifies the road's width, shoulder width, and median, accommodating different traffic volumes and vehicle types. Superelevation involves the banking of curves, counteracting centrifugal forces and enhancing vehicle stability. As disclosed herein, lane geometry refers to the design and characteristics of individual lanes within a road. The lane geometry includes lane width, lane markings, lane curvature, and the number of lanes in each direction. Lane curvature pertains to the alignment of individual lanes and their transitions at intersections and curves.

Figure 1:
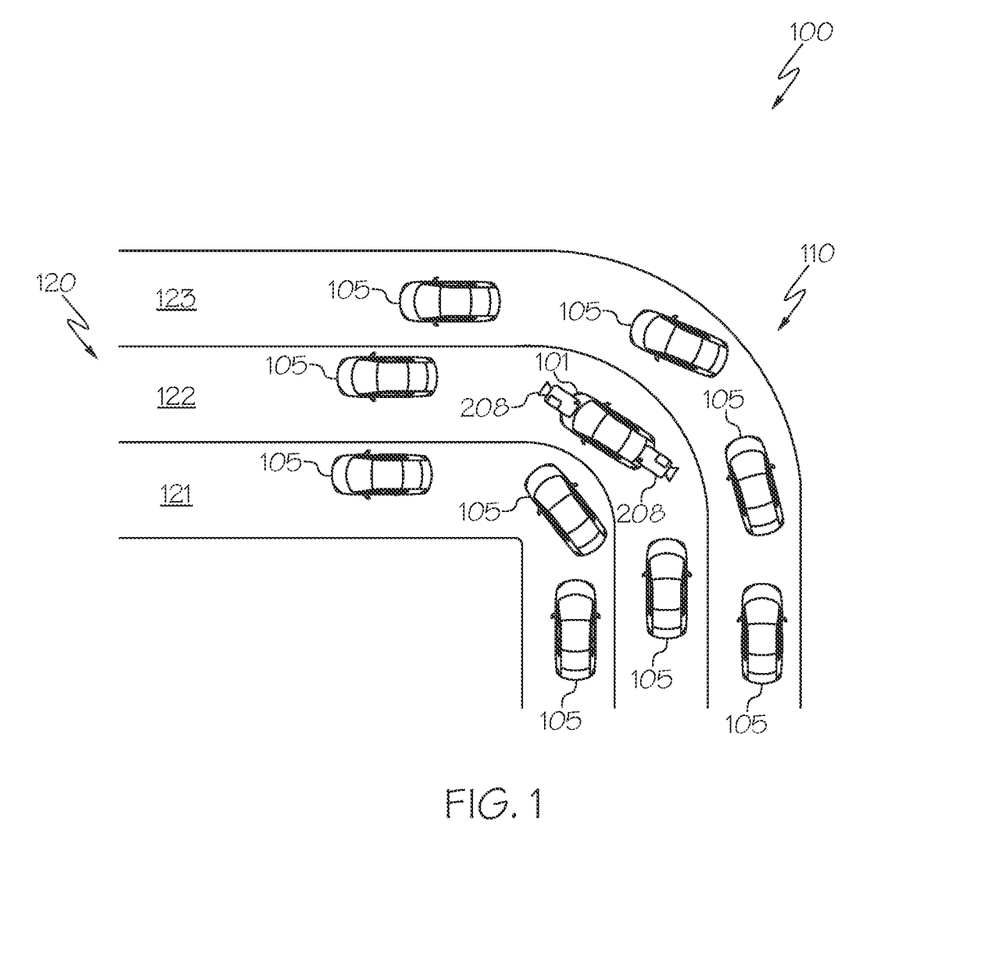
FIG. 1 schematically depicts a non-limiting system for an ego vehicle surrounded by multiple vehicles, according to one or more embodiments shown and described herein.
Figure 3:
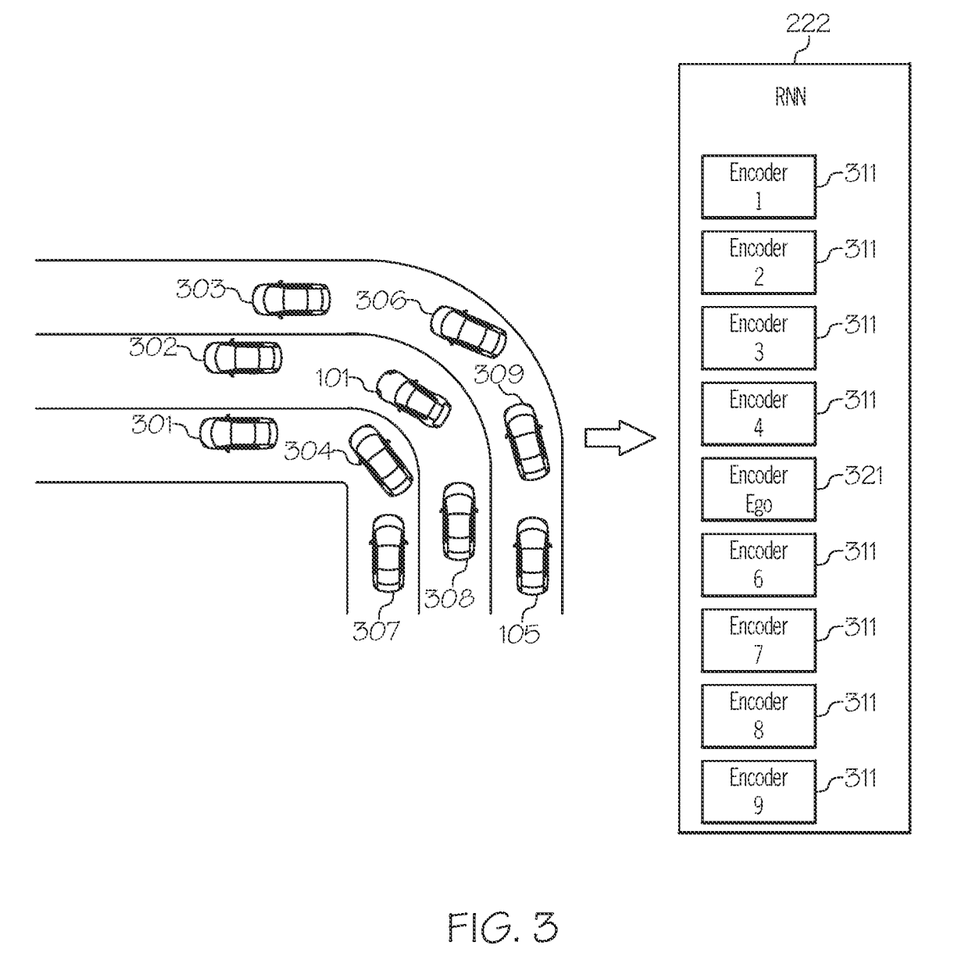
FIG. 3 schematically depicts encoding kinematic data of the surrounding vehicles and the ego vehicle, according to one or more embodiments shown and described herein.

Turning to figures, FIG. 1 generally depicts the collision control system 100 for an ego vehicle 101 surrounded by surrounding vehicles 105. The ego vehicle 101 is moving on a road having a road geometry 110 and a lane geometry 120. For example, in FIG. 1, the ego vehicle is driving on a road having a left turn. The ego vehicle 101 follows the road geometry 110 and moves from a section of the road in a north direction to a section of the road in a west direction by making a left turn. The road has a lane geometry 120 of three lanes, including a left lane 121, a middle lane 122, and a right lane 123. The ego vehicle 101 is in the middle lane 122 and is surrounded by surrounding vehicles 105. Among the surrounding vehicles 105, eight surrounding vehicles 105 are the closet, including a preceding left vehicle 301, a preceding vehicle 302, a preceding right vehicle 303, a left vehicle 304, a right vehicle 306, a following left vehicle 307, a following vehicle 308, and a following right vehicle 309 (e.g. as illustrated in FIG. 3). The preceding vehicle 302 and the following vehicle 308 are the surrounding vehicles 105 in the same lane with the ego vehicle 101, such as the middle lane 122. The preceding left vehicle 301, the left vehicle 304, and the following left vehicle 307 are in the lane left to the lane where the ego vehicle 101 is moving, such as the left lane 121 in the three-lane road in FIGS. 1 and 3. The preceding right vehicle 303, the right vehicle 306, and the following right vehicle 309 are in the lane right to the lane where the ego vehicle 101 is moving, such as the right lane 123 in the three-lane road in FIGS. 1 and 3. Throughout the disclosures, the ego vehicle 101 and the surrounding vehicles 105 may be collectively referred to as the interested vehicles. While FIGS. 1 and 3 illustrate 8 surrounding vehicles, more than or less than 8 surrounding vehicles may be present proximate to the ego vehicle 101.

The road geometry 110 may be, without limitations, a straight road, a horizontal curve, a vertical curve, a superelevation, or a cross-section. A straight road is a linear section of a roadway that does not include any curves or bends. A horizontal curve refers to a curved section of the road along the horizontal plane. The horizontal curve road may include the left turn road and right turn road. A vertical curve is a curve along the vertical plane of a road, allowing for a smooth transition between different gradients or slopes. The vertical curve road provides a gradual change in elevation to ensure driver comfort and safety. Superelevation is the inward tilt of a road surface on a curve. A road cross-section is a representation of a slice of the road, perpendicular to its length. The cross-section may include various layers and components that make up the road, such as the pavement, subbase, drainage elements, and more.

The lane geometry 120 may include a selection from, without limitations, lane number, lane width, lane markings, lane transition zones, lane splitting, and a combination thereof. Lane number refers to the total count of lanes on a roadway, specifying how many lanes are available for vehicles to travel in a given direction. Lane width is the measurement of the width of an individual lane. The lane width may determine the space available for vehicles to travel safely within a lane. Wider lanes may accommodate larger vehicles and provide more maneuvering space, while narrower lanes may be suitable for smaller roads or areas with limited space. Lane markings are painted lines on the road surface that indicate the boundaries of each lane. The lane markings help drivers stay within their lanes and maintain safe distances from surrounding vehicles. Lane transition zones are areas where lanes change, merge, or split. Land splitting refers to the separation of lanes where one lane branches off from another. For example, at a highway exit, an exit lane diverges from the main travel lanes of the highway.

Figure 2:
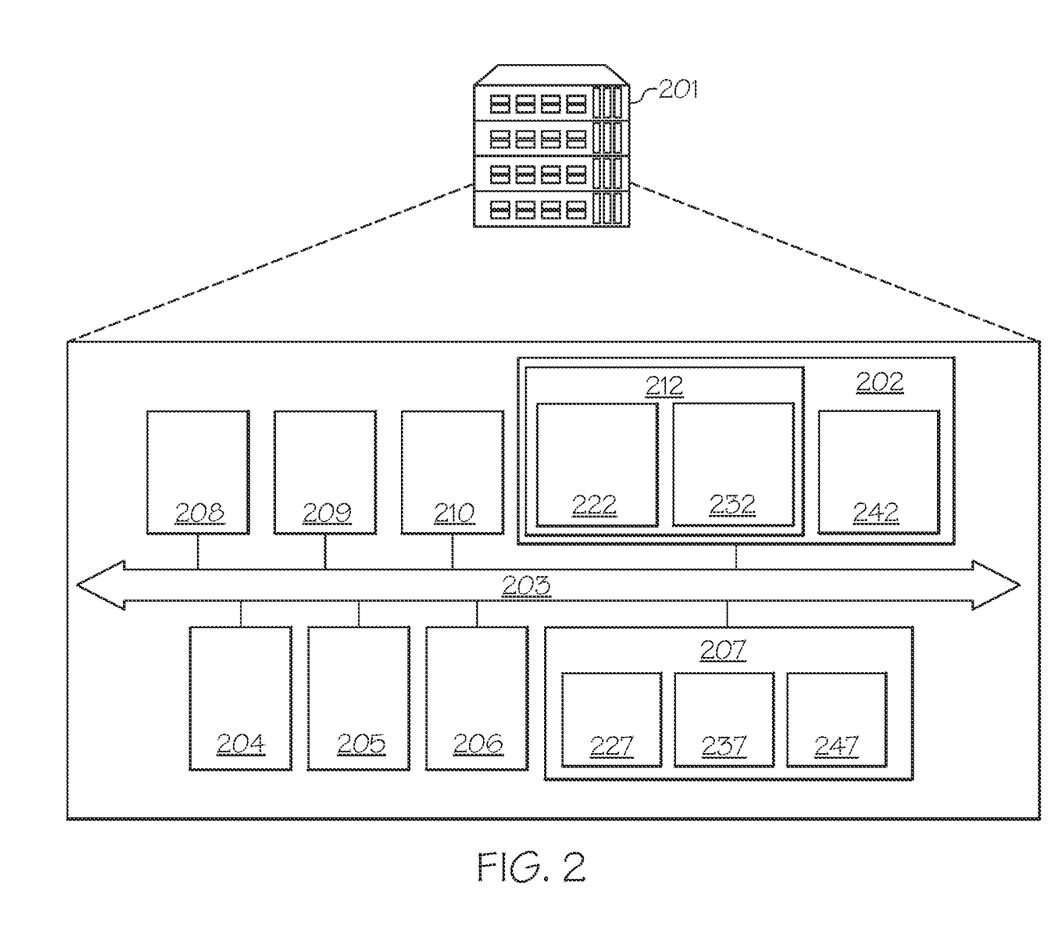
FIG. 2 schematically depicts non-limiting components of the devices on the ego vehicle moving surrounded by multiple vehicles, according to one or more embodiments shown and described herein.

The ego vehicle 101 in FIG. 1 may have a controller 201 (e.g. as illustrated in FIG. 2) and one or more proximity sensors 208 to capture the road conditions, including the road geometry 110, the lane geometry 120, and the surrounding vehicles 105. The proximity sensors 208 may generate sensor data about the road geometry 110, the lane geometry 120, and the surrounding vehicles 105, and send the sensor data to the controller 201. The proximity sensors 208 may continuously capture the road conditions and the sensory data, and may be sequential as a function of time. The controller 201, after receiving sensor data about the road geometry 110 and the lane geometry 120, may determine a driving maneuver to be performed by the ego vehicle 101 based on a road geometry 110 and a lane geometry 120. The driving maneuver may include, without limitations, a left-turn, a U-turn, a right-turn, and a roundabout. For example, as illustrated in FIG. 1, the ego vehicle 101 may determine the driving maneuver as a left turn based on the horizontal curve of the road and the lane markings of the lanes.

The ego vehicle 101 and the surrounding vehicles 105 depicted herein may be, for example, automobiles, motorcycles, scooters, buses, recreational vehicles, boats, or other vehicles. The ego vehicle 101 includes the proximity sensors 208 and functional sensors (e.g. as illustrated in FIG. 2), such as location sensors (such as global positioning system or GPS), light sensors, cameras, light detection and ranging (LIDAR) sensors, radars, or ultrasonic sensors, capable of detecting and recording various states and conditions of the roads and environments around the vehicles. For example, the functional sensors 210 (e.g. as illustrated in FIG. 2) may detect and store data corresponding to a speed of the ego vehicle 101, an acceleration of the ego vehicle 101, a yaw rate of the ego vehicle 101, the location of the change (e.g., GPS coordinates) of the ego vehicle 101, temperature, rain, snow, light levels, and sun position. The data collected by the functional sensors 210 may be stored and/or analyzed by the ego vehicle 101. The sensor data, such as the road geometry 110, the lane geometry 120, and the surrounding vehicles 105, may be stored in the data storage component 207 of the controller 201 (e.g. as illustrated in FIG. 2) as historical sensor data.

Referring to FIG. 2, example non-limiting components of the collision control system 100 are depicted. The collision control system 100 may include the controller 201. The controller 201 may include various modules. For example, the controller 201 may include a trajectory model 212 including an encoder module 222 and a trajectory prediction module 232, and a collision alert module 242. The controller 201 may further include various components, such as a memory component 202, a processor 204, an input/output hardware 205, a network interface hardware 206, a data storage component 207, and a local interface 203. The controller 201 may include one or more proximity sensors 208, one or more output devices 209, and one or more functional sensors 210.

The controller 201 may be any device or combination of components comprising the processor 204 and the memory component 202, such as a non-transitory computer readable memory. The processor 204 may be any device capable of executing the machine-readable instruction set stored in the non-transitory computer readable memory. Accordingly, the processor 204 may be an electric controller, an integrated circuit, a microchip, a computer, or any other computing device. The processor 204 may include any processing component(s) configured to receive and execute programming instructions (such as from the data storage component 207 and/or the memory component 202). The instructions may be in the form of a machine-readable instruction set stored in the data storage component 207 and/or the memory component 202. The processor 204 is communicatively coupled to the other components of the controller 201 by the local interface 203. Accordingly, the local interface 203 may communicatively couple any number of processors 204 with one another, and allow the components coupled to the local interface 203 to operate in a distributed computing environment. The local interface 203 may be implemented as a bus or other interface to facilitate communication among the components of the controller 201. In some embodiments, each of the components may operate as a node that may send and/or receive data. While the embodiment depicted in FIG. 2 includes a single processor 204, other embodiments may include more than one processor 204.

The memory component 202 (e.g., a non-transitory computer-readable memory component) may include RAM, ROM, flash memories, hard drives, or any non-transitory memory device capable of storing machine-readable instructions such that the machine-readable instructions can be accessed and executed by the processor 204. The machine-readable instruction set may include logic or algorithm(s) written in any programming language of any generation (e.g., 1GL, 2GL, 3GL, 4GL, or 5GL) such as, for example, machine language that may be directly executed by the processor 204, or assembly language, object-oriented programming (OOP), scripting languages, microcode, etc., that may be compiled or assembled into machine readable instructions and stored in the memory component 202. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. For example, the memory component 202 may be a machine-readable memory (which may also be referred to as a non-transitory processor-readable memory or medium) that stores instructions that, when executed by the processor 204, causes the processor 204 to perform a method or control scheme as described herein. While the embodiment depicted in FIG. 2 includes a single non-transitory computer-readable memory component, other embodiments may include more than one memory module. The memory may be used to store the trajectory model 212, the encoder module 222, the trajectory prediction module 232, and the collision alert module 242. The trajectory model 212, the encoder module 222, the trajectory prediction module 232, or the collision alert module 242 during operating may be in the form of operating systems, application program modules, and other program modules. Such program modules may include, but are not limited to, routines, subroutines, programs, objects, components, and data structures for performing specific tasks or executing specific abstract data types according to the present disclosure as will be described below.

The input/output hardware 205 may include a monitor, keyboard, mouse, printer, camera, microphone, speaker, and/or other device for receiving, sending, and/or presenting data. The network interface hardware 206 may include any wired or wireless networking hardware, such as a modem, LAN port, Wi-Fi card, WiMax card, mobile communications hardware, and/or other hardware for communicating with other networks and/or devices.

The data storage component 207 stores kinematic data 227, trajectory model data 237, and road and lane geometry data 247. The trajectory model 212, the encoder module 222, the trajectory prediction module 232, and the collision alert module 242 may also be stored in the data storage component 207 during operating or after operation.

Each of the encoder module 222, the trajectory prediction module 232, and the collision alert module 242 may include one or more machine learning algorithms or neural networks. The encoder module 222, the trajectory prediction module 232, and the collision alert module 242 may be trained and provided machine-learning capabilities via a neural network as described herein. By way of example, and not as a limitation, the neural network may utilize one or more artificial neural networks (ANNs), such as, without limitations, recurrent neural networks (RNNs) and graph neural networks (GNNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (sigmoid) function, a tan h function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling. The one or more ANN models may employ a combination of artificial intelligence techniques, such as, but not limited to, Deep Learning, Random Forest Classifiers, Feature extraction from audio, images, clustering algorithms, or combinations thereof. In some embodiments, a convolutional neural network (CNN) may be utilized. For example, a convolutional neural network (CNN) may be used as an ANN that, in a field of machine learning, for example, is a class of deep, feed-forward ANNs applied for audio analysis of the recordings. CNNs may be shift or space invariant and utilize shared-weight architecture and translation. Further, each of the various modules may include one or more generative artificial intelligence algorithms. The generative artificial intelligence algorithm may include a general adversarial network (GAN) that has one or more networks, a generator model, and a discriminator model. The generative artificial intelligence algorithm may also be based on variation autoencoder (VAE) or transformer-based models.

The one or more proximity sensors 208 may be one or more cameras, such as a front camera, a side camera, and a rear camera. In some embodiments, the proximity sensor 208 may be any device having an array of sensing devices capable of detecting radiation in an ultraviolet wavelength band, a visible light wavelength band, or an infrared wavelength band. The proximity sensor 208 may have any resolution. In some embodiments, one or more optical components, such as a mirror, fish-eye lens, or any other type of lens may be optically coupled to the proximity sensor 208. In embodiments described herein, the proximity sensor 208 may provide image data to the processor 204 or another component communicatively coupled to the local interface 203. The image data may include image data of the environment around the ego vehicle 101. In some embodiments, for example, in embodiments in which the ego vehicle 101 is an autonomous or semi-autonomous vehicle, the proximity sensor 208 may also provide navigation support. That is, data captured by the proximity sensor 208 may be used to autonomously or semi-autonomously navigate the ego vehicle 101.

The one or more proximity sensors 208 may operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image.

In operation, the one or more proximity sensors 208 capture image data and communicates the image data to the processor 204. The image data may be received by the processor 204, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

In embodiments, the controller 201 may include one or more output devices 209. Each of the one or more output devices 209 are coupled to the local interface 203 and communicatively coupled to the one or more processors 204. The one or more output devices 209 include, without limitations, video displays, audio speakers, and any other desired type of user output device.

In embodiments, the controller 201 may include one or more functional sensors 210 for detecting and measuring motion and changes in motion of the ego vehicle 101. Each of the one or more functional sensors 210 are coupled to the local interface 203 and communicatively coupled to the one or more processors 204. The functional sensors 210 may include inertial measurement units. Each of the one or more functional sensors 210 may include one or more accelerometers and one or more gyroscopes. Each of the one or more functional sensors 210 transforms sensed physical movement of the ego vehicle 101 into a signal indicative of an orientation, a rotation, a velocity, or an acceleration of the ego vehicle 101. The one or more functional sensors 210 may measure a speed, an acceleration, a yaw rate, and a traveled distance of the ego vehicle 101. The functional sensors 210 may also include a global positioning system (GPS).

Figure 4:
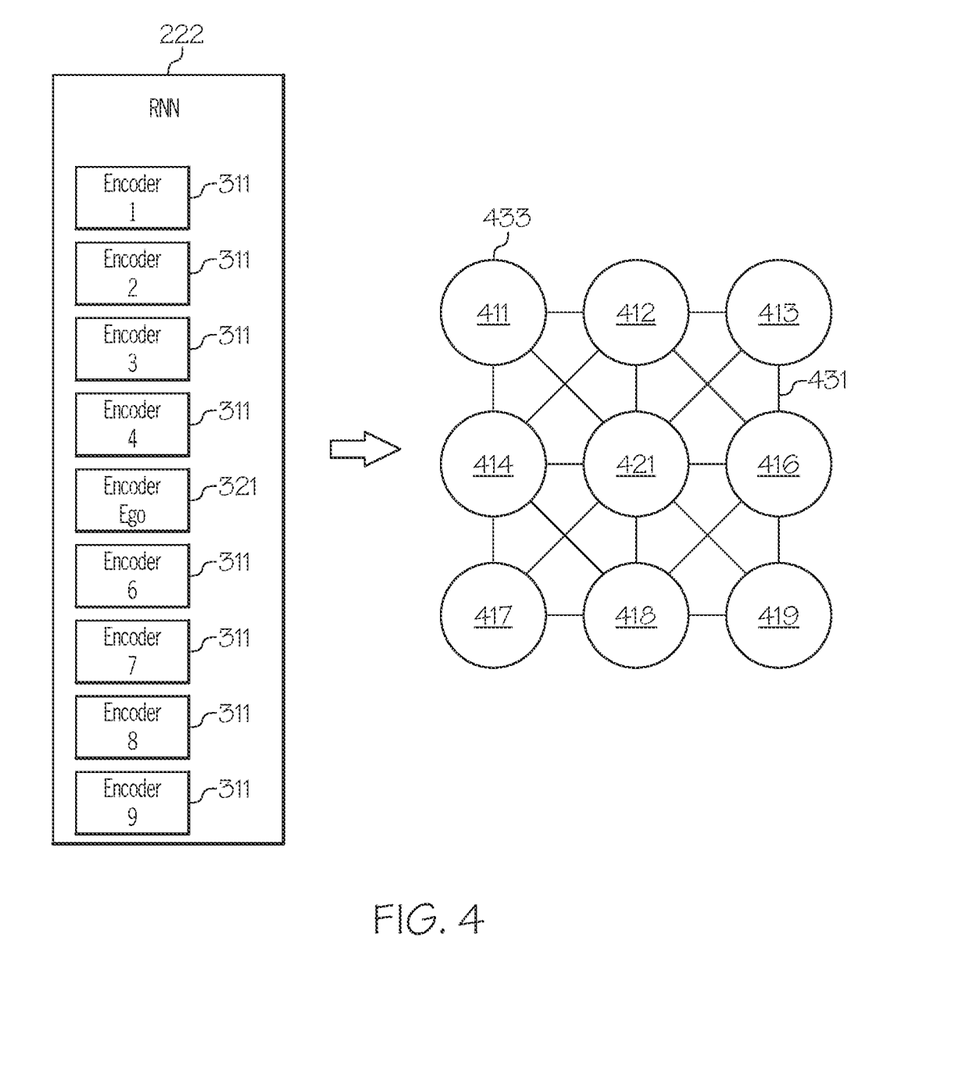
FIG. 4 schematically depicts generating spatial relationships between the ego vehicle and the surrounding vehicles, according to one or more embodiments shown and described herein.

Referring to FIGS. 3 and 4, the process of encoding kinematic data of the surrounding vehicles and the ego vehicle to generate spatial relationships between the ego vehicle and the surrounding vehicles is depicted. Based on the driving maneuver of the ego vehicle 101, such as a left-turn as illustrated in FIGS. 1 and 3, the collision control system 100 may retrieve a trajectory model corresponding to the driving maneuver from the trajectory model data 237 (e.g. as illustrated in FIG. 2). The trajectory model may be, without limitations, a left-turn trajectory model, a U-turn trajectory model, a right-turn trajectory model, or a roundabout trajectory model. In some embodiments, based on the location of the ego vehicle 101, the collision control system 100 may retrieve a trajectory model that is used for the location.

The collision control system 100 may load the retrieved trajectory model 212 to the memory component 202 (e.g. as illustrated in FIG. 2), which includes the encoder module 222 and the trajectory prediction module 232 (e.g. as illustrated in FIG. 2). For example, the collision control system 100 may load a left turn trajectory model 212 as illustrated in FIGS. 1 and 3 after determining the left-turn road geometry and the left-turn driving maneuver. The controller 201 (e.g. as illustrated in FIG. 2) may generate kinematic data of the ego vehicle 101 using the functional sensors 210 (e.g. as illustrated in FIG. 2) onboard. The controller 201 may further receive sensor data from the proximity sensors 208 to generate kinematic data of the surrounding vehicles 105 (e.g. as illustrated in FIG. 1) based on sensor data associated with the surrounding vehicles 105. The kinematic data of the ego vehicle 101 and the surrounding vehicles 105 may include a selection from, without limitations, a speed, an acceleration, a yaw rate, a distance, or any combination thereof. The encoder module 222 may encode the kinematic data of the ego vehicle 101 using an ego vehicle encoder 321 and encode the kinematic data of each surrounding vehicle 105 relative to the ego vehicle 101 using a surrounding vehicle encoder 311.

For example, as illustrated in FIG. 3, the surrounding vehicles 105 include the preceding left vehicle 301, the preceding vehicle 302, the preceding right vehicle 303, the left vehicle 304, the right vehicle 306, the following left vehicle 307, the following vehicle 308, and the following right vehicle 309. The kinematic data of each surrounding vehicle 105 may be encoded with a different surrounding vehicle encoder 311 of the encoder module 222, such as encoder 1 encoding the preceding left vehicle 301, encoder 2 encoding the preceding vehicle 302, encoder 3 encoding the preceding right vehicle 303, encoder 4 encoding the left vehicle 304, encoder 6 encoding the right vehicle 306, encoder 7 encoding the following left vehicle 307, encoder 8 encoding the following vehicle 308, and encoder 9 encoding the following right vehicle 309. Further, the encoder module 222 includes the ego vehicle encoder 321 to encode the kinematic data of the ego vehicle 101.

Still referring to FIG. 3, the encoders 311 and 321 may compress the input data, such as the kinematic data, the lane geometry 120, and the road geometry 110. In embodiments, the encoders 311 and 321 may encode the input data as a function of time as sequential input data. For example, the encoders 311 and 321 may encode the kinematic data including sequential kinematic data in a sequence of numerous time frames. In embodiments, the sequence of numerous time frames includes, without limitations, 1-100 historical time frames immediately before a current time frame. In embodiments, the sequence of numerous time frames includes, without limitations, 2, 4, 6, 8, 10, 12, 15, 17, 20, 25, 50, 100, 200, 400, 800, or 1600 historical time frames, or any number historical time frame suitable for the function of trajectory model 212 (e.g., as illustrated in FIG. 2), immediately before a current time frame. The trajectory model 212 may include a recurrent neural network (RNN) operably encoding the sequential kinematic data and output spatiotemporal output data, which include, without limitations, the kinematic data, road and lane data, and their relevance. The encoders 311 and 321 may have an input layer and one or more of hidden layers. The input data are fed into the one or more input layers, and are encoded through multiple hidden layers. Through the layers of the encoders 311 and 321, each layer learns the relevance of input data and selects input data based on the relevance to pass to the next layer such that the next layer retains the data of input data are more relevant to the spatial relationships between the ego vehicle 101 and the surrounding vehicles 105 as a function of time. By doing so, the input data and their relevance may be obtained and compressed to be output as the output data, such as spatiotemporal output data. The output data may include all the information in the input data and the relevance between the input data. In embodiments, the encoders 311 and 321 may learn linear relevance as well as nonlinear relevance between the input data and the historical data stored in the kinematic data 227 and the road and lane geometry data 247.

The encoders 311 and 321, which may include the RNN, may be pre-trained using sample sequential kinematic data of vehicles and sample trajectories of vehicles. The encoders 311 and 321, which may include the RNN, may be continuously trained using a spatial optimization algorithm comprising a loss function based on the predicted trajectories. A non-limiting training process is depicted below.

Upon outputting the output data, the encoder module 222 may use the spatial optimization algorithm to reconstruct the input data. The spatial optimization algorithm may train the encoders 311 and 321 using a loss function. The spatial optimization algorithm may generate output data $h=(Wx+b)$ that is transformed from the input kinematic data x. For example, the new representation $h_{ij}=g(Wx_{ij}+b)$ is transformed from raw input data $x_{ij}$, which is then used to reconstruct output $\tilde{x}_{ij}=f(W^T h_{ij}+b')$. The spatial optimization algorithm reconstructs output $x'=(W^T h+b')$, where W is weight, b is bias, $W^T$ and b are transverse values of W and b and are learned through backpropagation. In this operation, the spatial optimization algorithm may calculate, for each input data, a distance between an input data x and a reconstructed spatial relationship x', to yield a distance vector $|x-x'|$. The calculated vectors may be a high or a low-level dimensional dataset, such as 1D, 2D, or nD vectors. The spatial optimization algorithm may minimize the loss function that may be a utility function as the sum of all distance vectors. For pre-training, the input data may include sample sequential kinematic data of vehicles and sample trajectories of vehicles. For continuous training, the predicted trajectories are compared with real detected trajectories to further validate the optimization using the loss function described above.

Referring to FIG. 4, the output data from the encoders 311 and 321 are constructed into spatial relationships between the ego vehicle 101 and the surrounding vehicles 105. The trajectory prediction module 232 may include a graph neural network (GNN) operably predicting the future trajectories of the ego vehicle 101 and the surrounding vehicles 105 based on the spatial relationships. The GNN may create a network 410 of spatial relationships that include nodes 433 representing the ego vehicle (such as ego vehicle node 421) and the surround vehicles (such as surrounding vehicle node 411, node 412, node 413, node 414, node 416, node 417, node 418, and node 419) and edges 431 representing distances between the ego vehicle 101 and the surrounding vehicles 105. The network 410 may have a topology of, without limitations, 4 by 4, 3 by 3, or 2 by 2. When a surrounding vehicle 105 is absent from the topology, such edge may be set to zero.

After building the network 410 of nodes 433 and edges 431 including the spatial relationships between the ego vehicle 101 and the surrounding vehicles 105, the GNN may predict future trajectories of the surrounding vehicles based on the spatial relationships as illustrated in the network 410, the kinematic data, the road geometry 110, and the lane geometry 120. The prediction may be based on sequential data output by the encoders 311 and 321 in the form of spatiotemporal output data. The GNN may conduct a temporal sequence prediction. With the output data from the encoders 311 and 321, the GNN may predict a time into the future (a prediction horizon), which may be predetermined or learned during the operation of the ego vehicle 101 such that the collision control system 100 may find it desired to predict the trajectories. The prediction horizon may be, without limitations, from less than a second to seconds to minutes, such as 20 ms, 40 ms, 60 ms, 1 s, 2 s, 3 s, 5 s, 10 s, 20 s, 30 s, 1 min, 5 min, 10 min or any time in-between.

The GNN may be pre-trained using sample spatial relationships of vehicles, sample kinematic data of vehicles, sample road geometries, and sample lane geometries. During training, the trajectory prediction module 232 may learn to capture patterns in the input data and predict how the ego vehicle 101 and the surrounding vehicles 105 will move in the future based on the provided input data. The trained GNN may generate future trajectory predictions for each surrounding vehicle 105. These predictions may be in the form of spatiotemporal coordinates, indicating where the surrounding vehicle 105 is expected to be at different future time frames. The trajectory prediction module 232 may evaluate the predicted trajectories against ground truth data to assess the accuracy and performance of the GNN. The trajectory prediction module 232 may refine the GNN based on validation results and iterate through training and evaluation steps to improve prediction accuracy.

In some embodiments, the prediction of the future trajectories of the surrounding vehicles 105 is further based on surrounding visibility and time of day. This integration involves encoding information about visibility conditions and time into the input data fed into the prediction model. By doing so, the trajectory prediction module 232 may be capable of capturing how these contextual elements influence the behavior of surrounding vehicles 105. The GNN may encapsulate spatial relationships among the interested vehicles, integrating kinematic data, road geometry 110, and lane geometry 120. Leveraging this network 410 and encoded sequential data, such as velocities and accelerations, the GNN may predict and refine the prediction by incorporating factors like visibility conditions and time of day. For example, the trajectory prediction module 232 may acknowledge the data that vehicles are driving slower and are more tend to stray from the lanes in the evening or in dim light conditions.

In some embodiments, the prediction of the future trajectories of the surrounding vehicles 105 is further based on lane marker conditions. This integration involves encoding information about the lane marking conditions (e.g., poor or faded lane markings) into the input data fed into the prediction model. By doing so, the trajectory prediction module 232 may be capable of capturing how these contextual elements influence the behavior of surrounding vehicles 105. The GNN may encapsulate spatial relationships among the interested vehicles, integrating kinematic data, road geometry 110, and lane geometry 120. Leveraging this network 410 and encoded sequential data, such as velocities and accelerations, the GNN may predict and refine the prediction by incorporating factors like the lane marker conditions. For example, the trajectory prediction module 232 may acknowledge the data that vehicles are driving slower and are more tend to stray from the lanes when the lane markings are less distinct or faded.

Figure 5:
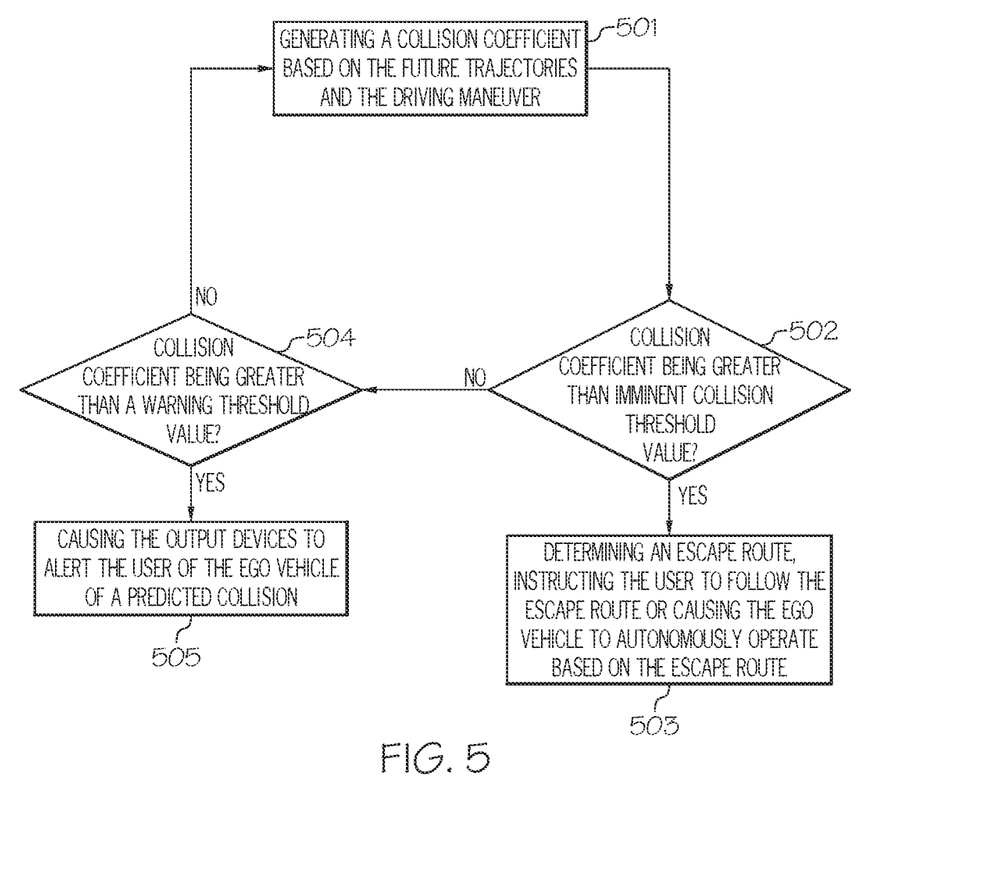
FIG. 5 depicts an illustrative block diagram of an alert mechanism in the system, according to one or more embodiments shown and described herein.

Referring to FIG. 5, an illustrative block diagram of a flow chart that may implement an alert mechanism performed by the system 100 is depicted. At block 501, after the trajectory prediction module 232 (e.g. as illustrated in FIG. 2) generates one or more future trajectories, the collision alert module 242 (e.g. as illustrated in FIG. 2) may estimate the future trajectories and generate a collision coefficient based on the future trajectories and the driving maneuver. The collision coefficient indicates a likelihood of collision between the ego vehicle 101 (e.g. as illustrated in FIGS. 1 and 3) and one or more of the surrounding vehicles 105 (e.g. as illustrated in FIGS. 1 and 3). At block 502, the collision alert module 242 may compare the collision coefficient with an imminent collision threshold value. In response to the collision coefficient being greater than the imminent collision threshold value (Yes to 502), at block 504, the collision alert module 242 may determine an escape route for the ego vehicle 101, and instruct a user of the ego vehicle to follow the escape route or cause the ego vehicle to autonomously operate based on the escape route. In response to the collision coefficient being less than or equal to the imminent collision threshold value (No to 502), at block 503, the collision alert module 242 may compare the collision coefficient with a warning threshold value. The warning threshold value may be lower than the imminent collision threshold value, such that a warning may be issued rather than causing the ego vehicle 101 to immediately follow the escape route. In response to the collision coefficient being greater than the warning threshold value (Yes to 503), at block 505, the collision alert module 242 may cause the output devices 209 to alert the user of the ego vehicle 101 of a predicted collision. In response to the collision coefficient being equal to or less than the warning threshold value (No to 503), the collision alert module 242 may repeat the performance of estimating the future trajectories and generating a collision coefficient based on the future trajectories and the driving maneuver at block 501.

The collision coefficient may be calculated based on several factors. In embodiments, the collision alert module 242 may determine the collision coefficient based on, without limitations, the physical-based equations (such as Newton's Laws), probability of collision (such as based on historical collision data, environmental conditions), Game theory (such as Nash equilibrium solution), vehicle dynamics and constraints (such as the physical constraints of the surrounding vehicles 105 like their maximum braking and acceleration capability), and environment factors (such as road conditions, visibility, and weather). The collision coefficient may be a value between 0 and 1, with 0 referring to no collision and 1 to a collision. The imminent collision threshold value may be a value close to 1 (such as 0.8) and the warning threshold value may be a value greater than 0.5 but less than the imminent collision threshold.

Figure 6:
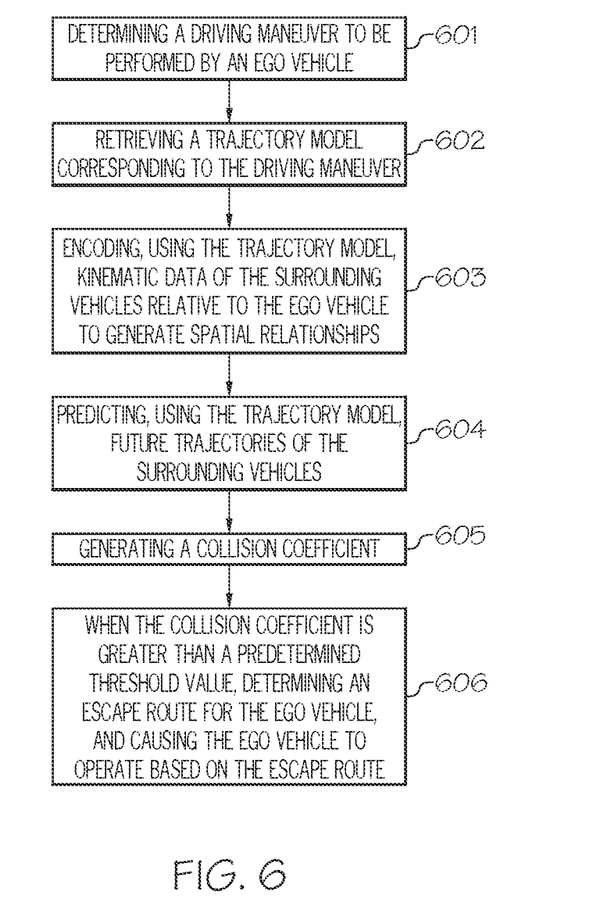
FIG. 6 illustrates a flow diagram of illustrative steps for collision control for the ego vehicle surrounded by multiple vehicles, according to one or more embodiments shown and described herein.

Referring to FIG. 6, a flow diagram of illustrative steps for collision control for the ego vehicle surrounded by multiple vehicles is depicted. At block 601, the method for collision control includes determining a driving maneuver to be performed by an ego vehicle based on a road geometry and a lane geometry. The interested vehicles may include surrounding vehicles and the ego vehicle is surrounded by the surrounding vehicles. The road geometry may be, without limitations, a straight road, a horizontal curve, a vertical curve, a superelevation, or a cross-section. The lane geometry may include, without limitations, a selection from lane number, lane width, lane markings, lane transition zones, lane splitting, and a combination thereof.

At block 602, the method for collision control includes retrieving a trajectory model corresponding to the driving maneuver. The trajectory model may be, without limitations, a left-turn trajectory model, a U-turn trajectory model, a right-turn trajectory model, or a roundabout trajectory model. The kinematic data may include, without limitations, sequential kinematic data in sequence time frames.

At block 603, the method for collision control includes encoding, using the trajectory model, kinematic data of the surrounding vehicles relative to the ego vehicle to generate spatial relationships between the interested vehicles. The kinematic data may be generated based on sensor data associated with the surrounding vehicles. The sensor data acquired by sensors may include, without limitations, a selection from a camera, a light sensor, a global positioning system (GPS), a light detection and ranging (LIDAR), an ultrasonic sensor, and a combination thereof. The kinematic data may include, without limitations, a selection from a speed, an acceleration, a yaw rate, a distance, or any combination thereof.

The trajectory model may include an RNN operably encoding the sequential kinematic data. The RNN may be pre-trained using sample sequential kinematic data of vehicles and sample trajectories of vehicles and be continuously trained using a spatial optimization algorithm having a loss function based on the predicted trajectories.

At block 604, the method for collision control includes predicting, using the trajectory model, future trajectories of the surrounding vehicles based on, without limitations, the spatial relationships, the kinematic data, the road geometry, and the lane geometry. The prediction of the future trajectories of the surrounding vehicles is further based on surrounding visibility and time of day. The trajectory model may include the GNN operably predicting the future trajectories based on the spatial relationships. The spatial relationships may include nodes representing the interested vehicles and edges representing distances between each said interested vehicle. The GNN may be pre-trained using sample spatial relationships of vehicles, sample kinematic data of vehicles, sample road geometries, and sample lane geometries. The GNN may be continuously trained by validating the predicted future trajectories with detected trajectories.

At block 605, the method for collision control includes generating a collision coefficient indicating a likelihood of collision between the ego vehicle and one or more of the surrounding vehicles based on the future trajectories and the driving maneuver.

At block 606, the method for collision control includes, when the collision coefficient is greater than a predetermined threshold value, determining an escape route for the ego vehicle, and causing the ego vehicle to operate based on the escape route. In some embodiments, when the collision coefficient is beyond a warning threshold value, alerting the ego vehicle of a predicted collision.

As used herein, the singular forms "a," "an" and "the" include plural referents unless the context clearly dictates otherwise. Thus, for example, reference to "a" component includes aspects having two or more such components unless the context clearly indicates otherwise.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A method comprising:
   determining a driving maneuver to be performed by an ego vehicle based on a road geometry and a lane geometry, where the ego vehicle is surrounded by one or more surrounding vehicles;
   retrieving a trajectory model corresponding to the driving maneuver;
   encoding, using the trajectory model, kinematic data of the surrounding vehicles relative to the ego vehicle to generate spatial relationships between the surrounding vehicles and the ego vehicle, wherein the kinematic data are generated based on sensor data associated with the surrounding vehicles;
   predicting, using the trajectory model, future trajectories of the surrounding vehicles based on the spatial relationships, the kinematic data, the road geometry, and the lane geometry;
   generating a collision coefficient indicating a likelihood of collision between the ego vehicle and one or more of the surrounding vehicles based on the future trajectories and the driving maneuver; and
   in response to determining that the collision coefficient is greater than a predetermined threshold value: determining an escape route for the ego vehicle and causing the ego vehicle to autonomously operate based on the escape route.

2. The method of claim 1, wherein the trajectory model is a left-turn trajectory model, a U-turn trajectory model, a right-turn trajectory model, or a roundabout trajectory model.

3. The method of claim 1, wherein the prediction of the future trajectories of the surrounding vehicles is further based on surrounding visibility and time of day.

4. The method of claim 1, wherein the kinematic data comprises sequential kinematic data in a sequence of time frames, and wherein the trajectory model comprises a recurrent neural network (RNN) operably encoding the sequential kinematic data.

5. The method of claim 4, wherein the RNN is pre-trained using sample sequential kinematic data of vehicles and sample trajectories of vehicles.

6. The method of claim 4, wherein the RNN is continuously trained using a spatial optimization algorithm comprising a loss function based on the predicted future trajectories.

7. The method of claim 1, wherein the trajectory model comprises a graph neural network (GNN) operably predicting the future trajectories based on the spatial relationships, and wherein the spatial relationships comprise nodes representing the ego vehicle and the surrounding vehicles and edges representing distances between each vehicle among the ego vehicle and the surrounding vehicles.

8. The method of claim 7, wherein the GNN is pre-trained using sample spatial relationships of vehicles, sample kinematic data of vehicles, sample road geometries, and sample lane geometries.

9. The method of claim 7, wherein the GNN is continuously trained by validating the predicted future trajectories with detected trajectories.

10. The method of claim 1, wherein the sensor data are acquired by sensors comprising a selection from a camera, a light sensor, a global positioning system (GPS), a light detection and ranging (LIDAR), an ultrasonic sensor, and a combination thereof.

11. The method of claim 1, wherein the kinematic data comprises a selection from a speed, an acceleration, a yaw rate, a distance, or any combination thereof.

12. The method of claim 1, wherein the road geometry is a straight road, a horizontal curve, a vertical curve, a superelevation, or a cross-section.

13. The method of claim 1, wherein the lane geometry comprises a selection from lane number, lane width, lane markings, lane transition zones, lane splitting, and a combination thereof.

14. The method of claim 1, further comprising
in response to determining that the collision coefficient is beyond a warning threshold value, alerting the ego vehicle of a predicted collision.

15. A system comprising an ego vehicle, sensors operable to collect sensor data associated with surrounding vehicles surrounding the ego vehicle, and a controller configured to:
determine a driving maneuver to be performed by the ego vehicle based on a road geometry and a lane geometry, wherein the ego vehicle is surrounded by one or more surrounding vehicles;
retrieve a trajectory model corresponding to the driving maneuver;
encode, using the trajectory model, kinematic data of the surrounding vehicles relative to the ego vehicle to generate spatial relationships between the ego vehicle and the surrounding vehicles, where the kinematic data are generated based on the sensor data;
predict, using the trajectory model, future trajectories of the surrounding vehicles based on the spatial relationships, the kinematic data, the road geometry, and the lane geometry;
generate a collision coefficient indicating a likelihood of collision between the ego vehicle and one or more of the surrounding vehicles based on the future trajectories and the driving maneuver; and
in response to determining that the collision coefficient is greater than a predetermined threshold value, determine an escape route for the ego vehicle, and cause the ego vehicle to autonomously operate based on the escape route.

16. The system of claim 15, wherein the trajectory model is a left-turn trajectory model, a U-turn trajectory model, a right-turn trajectory model, or a roundabout trajectory model.

17. The system of claim 15, wherein the kinematic data comprises sequential kinematic data in a sequence of time frames, and the trajectory model comprises a recurrent neural network (RNN) operably encoding the sequential kinematic data and the RNN is continuously trained using a spatial optimization algorithm comprising a loss function based on the predicted future trajectories.

18. The system of claim 15, wherein:
the trajectory model comprises a graph neural network (GNN) operably predicting the future trajectories based on the spatial relationships;
the spatial relationships comprise nodes representing the ego vehicle and the surrounding vehicles and edges representing distances between each vehicle among the ego vehicle and the surrounding vehicles; and
the GNN is continuously trained by validating the predicted future trajectories with detected trajectories.

19. The system of claim 15, wherein the kinematic data comprises a selection from a speed, an acceleration, a yaw rate, an distance, or any combination thereof.

20. The system of claim 15, wherein the road geometry is a straight road, a horizontal curve, a vertical curve, a superelevation, or a cross-section, and the lane geometry comprises a selection from lane number, lane width, lane markings, lane transition zones, lane splitting, and a combination thereof.

* * * * *

UNITED STATES PATENT AND TRADEMARK OFFICE
CERTIFICATE OF CORRECTION

| | | |
|---|---|---|
| PATENT NO. | : 12,415,545 B2 | Page 1 of 1 |
| APPLICATION NO. | : 18/455020 | |
| DATED | : September 16, 2025 | |
| INVENTOR(S) | : Rohit Gupta, Amr Abdelraouf and Kyungtae Han | |

It is certified that error appears in the above-identified patent and that said Letters Patent is hereby corrected as shown below:

On the Title Page

Item (73), assignee 2, city, delete "Toyota (JP)" and insert --Toyota-shi (JP)--, therefor.

In the Specification

In Column 2, Line(s) 53, delete "providing" and insert --provide--, therefor.

In Column 3, Line(s) 62, delete "closet," and insert --closest,--, therefor.

In Column 6, Line(s) 55, delete "operating" and insert --operation--, therefor.

In Column 7, Line(s) 5, delete "(ReLu)" and insert --(ReLU)--, therefor.

In Column 8, Line(s) 2, delete "communicates" and insert --communicate--, therefor.

In Column 9, Line(s) 47, after "number", insert --of--.

In Column 9, Line(s) 55, before "hidden", delete "of".

In Column 11, Line(s) 38, before "tend", delete "are more".

In Column 11, Line(s) 56, before "tend", delete "are more".

In the Claims

In Column 16, Line(s) 29, Claim 19, delete "an distance," and insert --a distance,--, therefor.

Signed and Sealed this
Ninth Day of December, 2025

John A. Squires
*Director of the United States Patent and Trademark Office*